United States Patent [19]

Laham

[11] 4,420,160

[45] Dec. 13, 1983

[54] FACE SEAL SYSTEM

[75] Inventor: Herman C. Laham, Torrance, Calif.

[73] Assignee: The Garrett Corporation, Los Angeles, Calif.

[21] Appl. No.: 383,367

[22] Filed: May 28, 1982

Related U.S. Application Data

[63] Continuation of Ser. No. 129,080, Mar. 10, 1980, abandoned.

[51] Int. Cl.³ ............................................... F16J 15/34
[52] U.S. Cl. ...................................... 277/40; 277/93 D
[58] Field of Search ............. 277/40, 81 R, 93, 93 SD

[56] References Cited

U.S. PATENT DOCUMENTS

| | | | |
|---|---|---|---|
| 3,663,026 | 5/1972 | Mincuzzi | 277/237 |
| 3,689,083 | 9/1972 | Grendwalt | 277/40 |
| 3,784,213 | 1/1974 | Voitik | 277/40 |

Primary Examiner—Robert I. Smith
Attorney, Agent, or Firm—A. J. Miller; J. Henry Muetterties

[57] ABSTRACT

A face seal system for sealing passage of a rotatable shaft through a wall separating regions subject to differential fluid pressure. A seal member is pressure compensated for sealing the passage with a sealing force responsive to the pressure differential across the passage.

10 Claims, 3 Drawing Figures

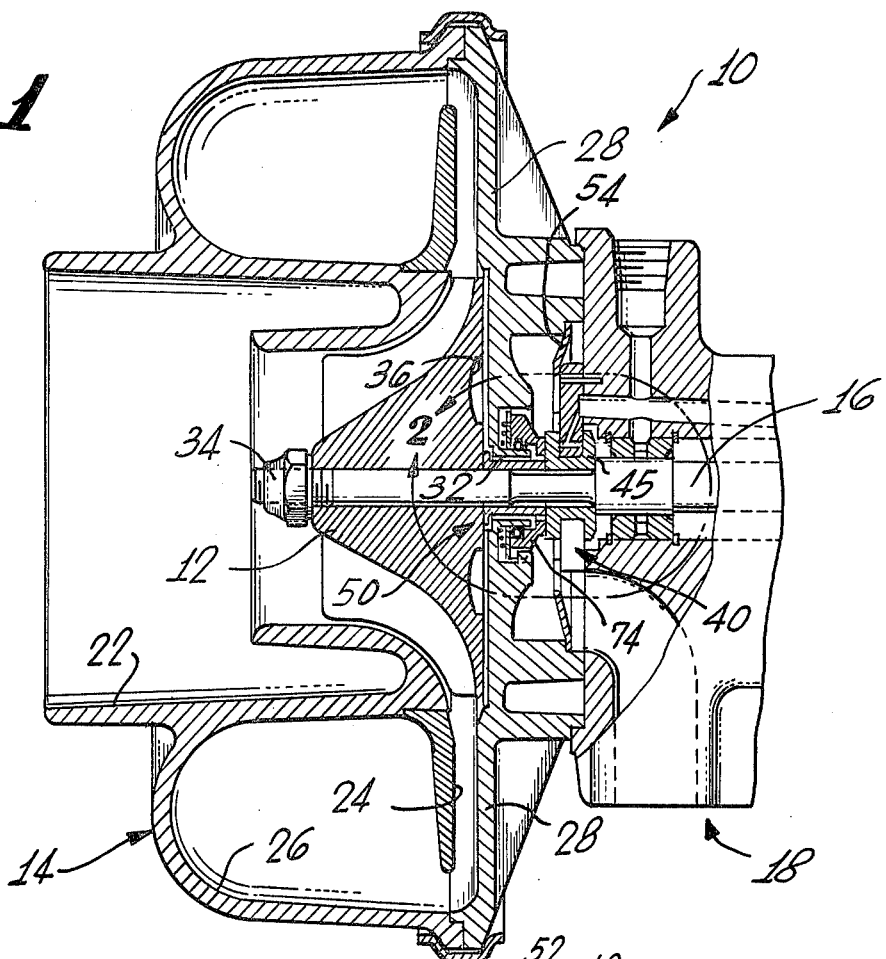
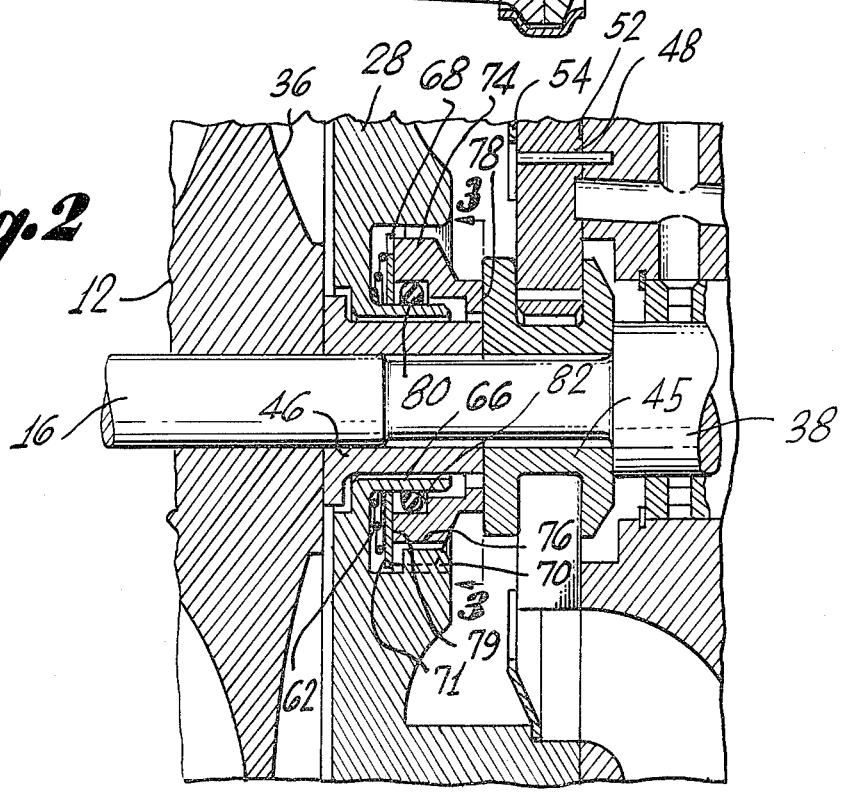

FACE SEAL SYSTEM

This is a continuation of application Ser. No. 129,080 filed Mar. 10, 1980 and now abandoned.

BACKGROUND OF THE INVENTION

This invention relates to a face seal system. More specifically, this invention relates to an improved face seal system particularly designed for cooperation with a thrust bearing system in a turbocharger for sealing passage of a turbocharger shaft through a wall.

In a turbocharger, a turbine wheel and a compressor impeller are carried on a common shaft. The turbine wheel is received within a turbine housing for communication with exhaust gases from an engine, whereby the shaft is rotatably driven during engine operation. The shaft is supported by suitable journal bearings and thrust bearings within a center housing connected between the turbine housing and a compressor housing receiving the compressor impeller. The exhaust gas driven turbine wheel thereby drives the compressor impeller to compress charge air for supply to the intake of the engine, all in a well-known manner.

Typically, the rotating shaft in a turbocharger is capable of being driven at relatively high rotational speeds, such as on the order of about 100,000 RPM or more. Such rotational speeds require the use of precision bearing components together with an effective system of bearing lubrication. In this regard, lubricating oil is commonly pumped under pressure to the turbocharger center housing for lubricating the shaft bearings to prevent excessive bearing heating and wear.

The effective lubrication of turbocharger shaft bearings without leakage of oil from the center housing, particularly into the compressor housing, has long been a troublesome problem in the design of turbochargers. Specifically, during normal operation of the turbocharger, localized fluid pressure in the region between the back side of the compressor impeller and the backplate wall separating the center housing from the compressor housing is frequently less than the fluid pressure within the center housing. Thus, a substantial pressure differential is created tending to cause oil leakage from the center housing around the rotating shaft and into the compressor housing. This leakage tendency is substantially enhanced by the high rotational speed of the shaft causing relatively rapid wear of sealing components such as seal rings and the like.

A wide variety of seal systems have been proposed for sealing passage of the turbocharger shaft through the backplate separating the center and compressor housings of the turbocharger. Some of these systems include various seal ring arrangements intended to block oil leakage through the shaft passage. See, for example, U.S. Pat. Nos. 3,397,947; 3,077,296; 2,953,416; 2,785,022; 2,362,667; and 2,054,219. However, these systems are not totally satisfactory in that the seal rings tend to exhibit relatively high rates of wear resulting in premature leakage. Oher arrangements have included slingers and the like in an attempt to move oil away from the region of the leakage path. See, for example, U.S. Pat. Nos. 3,494,679 and 4,157,834. However, these systems also are not altogether successful in eliminating leakage in commercial turbochargers. Still other systems have been proposed including the incorporation of cartridge-type pressure-responsive seal assemblies into the shaft passage between the compressor housing and center housing. See, for example, U.S. Pat. No. 2,393,944. However, these systems introduce into the turbocharger an additional and undesirable leakage path around the outer diameter of the seal cartridge.

The face seal system of this invention overcomes the problems and disadvantages of the prior art by providing an improved face seal system quickly and easily mounted directly into the wall separating the turbocharger compressor and center housing, and including means for varying sealing forces in response to the pressure differential across said wall to limit seal wear.

SUMMARY OF THE INVENTION

In accordance with the invention, a turbocharger includes a turbocharger shaft extending through a passage formed in a common wall, or backplate, separating a turbocharger compressor housing and a center housing. The shaft carries a compressor impeller for rotation within the compressor housing, and is suitably guided for rotation by lubricated bearing means within the center housing. The bearing means includes a thrust bearing system having a thrust collar and a thrust bearing disposed generally adjacent the backplate for limiting axial excursions of the shaft.

The face seal system comprises a generally annular seal member formed from carbon or the like, and having an axially presented seal face for sealing engagement with the thrust collar carried on the turbocharger shaft. The seal member is concentrically received about an annular flange concentrically spaced from the shaft and extending from the backplate axially into the center housing. A resilient seal ring is interposed between the flange and the seal member, and a spring-loaded thrust washer urges the seal member toward a position with its seal face in sealing engagement with the thrust collar. Importantly, the backplate includes anti-rotation lugs in registry with slots in the seal member for preventing rotation of the seal member along with the shaft.

The seal member and the thrust washer are arranged for axial movement in response to the pressure differential through said passage to vary the sealing force applied to the seal member in response to the pressure differential. More specifically, when the pressure within the center housing exceeds the pressure within the compressor housing adjacent the shaft passage, center housing pressure acts upon the thrust washer to urge the thrust washer against the seal member and thereby increase the sealing force between the seal face and thrust collar. However, when the pressure differential reverses, the compressor housing pressure acting through the shaft passage urges the resilient seal ring against the thrust washer in a direction away from the seal member to substantially reduce the sealing force between the seal face and thrust washer.

BRIEF DESCRIPTION OF THE DRAWINGS

The accompanying drawings illustrate the invention. In such drawings:

FIG. 1 is a fragmented vertical section of the compressor end of a turbocharger showing a face seal system of this invention;

FIG. 2 is an enlarged fragmented vertical section of a portion of FIG. 1; and

DETAILED DESCRIPTION OF THE PREFERRED EMBODIMENT

Figure 3:
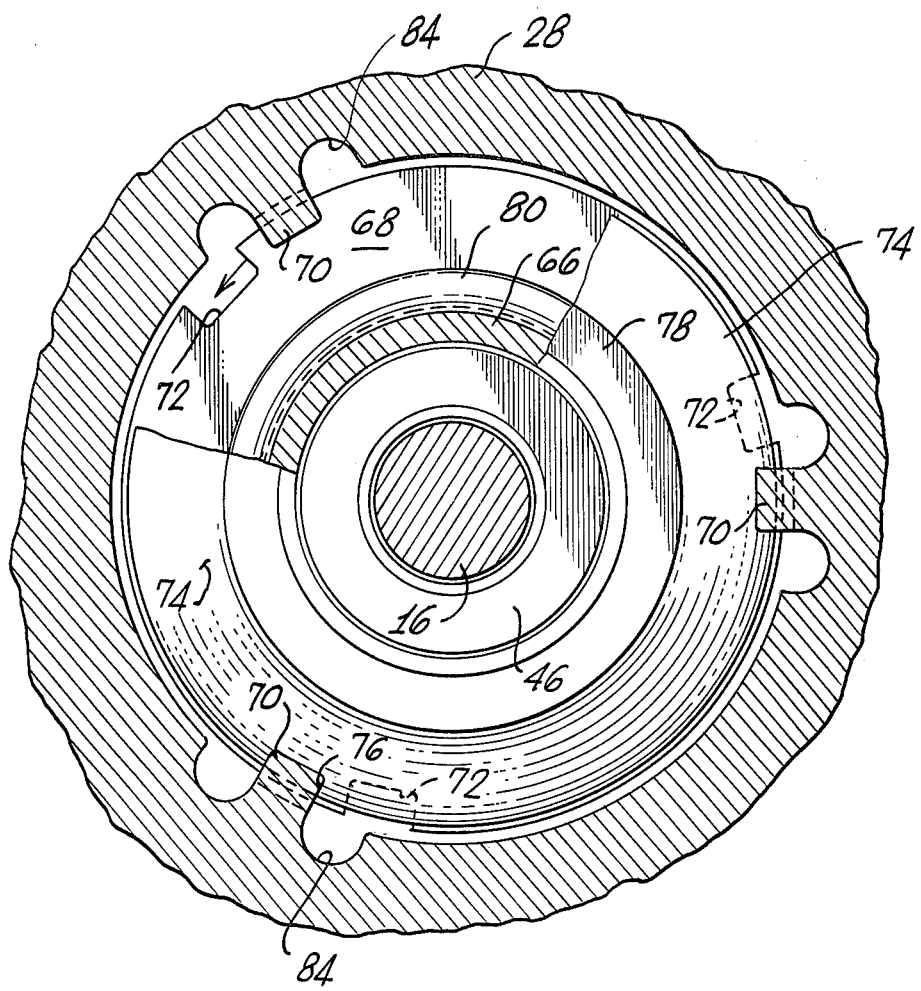
FIG. 3 is a fragmented vertical section taken along the line of 3—3 of FIG. 2 with portions broken away.

A portion of a turbocharger 10 is shown in FIG. 1, and comprises a compressor impeller 12 carried on a rotatable shaft 16 within a compressor housing 14. The shaft 16 extends from the impeller 12 through a turbocharger center housing 18 for connection to a turbine carried within a turbine housing (not shown). In operation, exhaust gases from an internal combustion engine are supplied to the turbine (not shown) to rotatably drive the turbine, and thereby also rotatably drive the turbocharger shaft 16. Such driving causes corresponding rotation of the impeller 12 within the compressor housing 14 serving to draw air through a compressor inlet 22 for compression, and discharge through a diffuser 24 and an outlet volute 26 to the intake (not shown) of an internal combustion engine.

As shown in FIG. 1, the center housing 18 and the compressor housing 14 are separated by a common wall, or compressor backplate 28. The shaft 16 extends through the center housing 18, and further through a central passage 32 in the compressor backplate 28 to the compressor housing 14. The compressor impeller 12 is received over one end of the shaft 16 within the compressor housing 14, and is suitably secured as by a nut 34 for rotation therewith. Importantly, the back side 36 of the impeller 12 is axially spaced slightly away from the backplate 28 so as to avoid contact therewith during impeller rotation.

During rotation of the impeller 12, air is compressed within the compressor housing 14 whereby a superatmospheric pressure prevails around the periphery of the impeller. However, it is well known that localized pressure between the back side 36 of the impeller 12 and the compressor backplate 28 may vary significantly from the superatmospheric pressure at the periphery of the impeller. Moreover, it is known that such localized pressure is highly dependent upon the specific operating conditions of the turbocharger. For example, pressure in the vicinity of the backplate shaft passage 32 may vary between a superatmospheric pressure at relatively high speed impeller rotation to a subatmospheric pressure at relatively low speed impeller rotation, such as during engine idling conditions. Since the pressure within the center housing is normally near atmospheric pressure for all conditions of turbocharger operation, potential exists for leakage of fluid such as lubricating oil from the center housing 18 through the shaft passage 32 and into the compressor housing 14 whenever the center housing pressure is the larger pressure. That is, the pressure differential through the passage 32 may function during at least some periods of turbocharger operation to pump lubricating oil from the center housing 18 into the compressor housing 14. When this occurs, it is necessary to provide a sealing system to prevent the leakage of oil through the backplate shaft passage 32.

As shown in the drawings, a face seal system 50 of this invention is incorporated into the compressor backplate 28 within the center housing 18, and reacts between the backplate 28 and a thrust bearing system 40 carried about the turbocharger shaft 16. More specifically, the thrust bearing system 40 is provided for controlling undesirable axial excursions of the shaft 16, and thereby functions to locate precisely the axial positions of the compressor impeller 12 and the turbine (not shown) within their respective housings. The thrust bearing system 40 comprises a thrust collar 45 snugly received over the shaft 16 for rotation therewith at a position abuttingly between an enlarged shaft portion 38 and a bushing-shaped spacer 46 interposed between the impeller 12 and the thrust collar 45. Importantly, the thrust collar 45 has a radially outwardly open, generally U-shaped cross section for reception of a horseshoe-shaped thrust bearing 48. As shown, this bearing 40 is retained axially between a wall 52 of the center housing 18 and an annular spring member 54, all in a well-known manner and as specifically described in U.S. Pat. No. 4,157,834.

The face seal system 50 comprises a helical compression spring 62 having a relatively low spring rate received within a recess 64 formed within the backplate 28 and opening axially toward the interior of the center housing 18. The recess 64 defines an annular flange 66 formed concentrically about and slightly spaced with respect to the spacer 46, and extending axially into the center housing toward the thrust collar 45. Moreover, the backplate 28 includes a plurality of anti-rotation lugs 70 projecting radially inwardly into the recess 64 to form a relatively small annular undercut 71 for reception and positioning of the seal system 50, as will be described in more detail.

A thrust washer 68 includes at its periphery a plurality of slots 72 circumferentially arranged for registry with the anti-rotation lugs 70 on the center housing backplate 28. The thrust washer 68 is thus receivable past the anti-rotation lugs 70, and is indexable with respect to the lugs 70 as illustrated in FIG. 3 for reception within the recess 64 and retention therein by the lugs 70. As shown, the spring 62 biases the thrust washer 68 axially to the right as viewed in FIG. 2 in engagement with the anti-rotation lugs 70. Conveniently, the spring 62 is formed to have a conical cross section so as to have its coils compressible substantially into a single plane.

A seal member 74 has a generally annular shape, and is formed from a suitable sealing composition such as carbon or the like. The seal member 74 includes about its periphery a plurality of slots 76 configured for registry with the anti-rotation lugs 70. The seal member 74 is thus received concentrically about the flange 66 with its slots 76 axially receiving the lugs 70 to prevent rotation of the seal member. The seal member 74 includes an axially presented seal face 78 for bearing and sealing engagement with the rotating thrust collar 45 mounted on the shaft 16. The seal member also includes an opposite axially presented face 79 for bearing engagement with the thrust washer 68. Importantly, the axial length of the seal member 74 is chosen such that the spring 62 urges the thrust washer 68 into engagement with the face 79 of the seal member 74, which correspondingly urges the sealing face 78 of the seal member 74 into sealing engagement with the thrust collar 45.

An annular resilient seal ring 80, such as an O-ring, is interposed radially between the backplate flange 66 and the seal member 74 to seal against passage of fluids therebetween. Moreover, this seal ring 80 is axially positioned between the thrust washer 68 and a radially stepped shoulder 82 formed on the inner diameter of the seal member 74. The thrust washer 68 and the seal ring 80 combine to adjust the sealing force between the seal face 78 and the thrust collar 45. More specifically, as shown, the spring 62 normally biased the thrust washer 68 against the rear face 79 of the seal member 74 to urge the seal face 78 against the thrust collar 45. When pressure within the center housing 18 is relatively high, this pressure is communicated to the recess 64 by lobed passages 84 adjacent the anti-rotation lugs 70 to urge the thrust washer 68 axially against the seal member 74 with increased force. This pressure also urges the resilient seal ring 80 against the shoulder 82 to form a positive seal between the non-rotating seal member 74 and the flange 66. Accordingly, fluid leakage from the center housing past the seal face 78 or the resilient seal ring 80 is prevented.

When the pressure within the compressor housing 14 adjacent the shaft passage 32 is relatively high with respect to pressure within the center housing 18, the relative pressures acting upon the resilient seal ring 80 urge said ring axially against the thrust washer 68 to counteract at least some of the axially applied spring force. When this happens, total forces urging the seal face 78 axially against the thrust collar 45 are substantially reduced. This prevents undue wear of the seal member 74 and its seal face 78 during operating conditions of the turbocharger when the relative pressure differential across the shaft passage 32 is sufficient to prevent oil leakage.

The present invention thus provides a pressure compensating face seal system which is quickly and easily mounted directly within the backplate of a turbocharger. The system includes a seal member of a high quality seal material such as carbon. Potential leakage between the seal member and the non-rotational backplate is prevented by a resilient seal ring. Potential leakage between the seal member and rotating components is prevented by a seal face which is variably force-loaded depending upon turbocharger operating characteristics. Since the seal system is mounted directly within the compressor backplate 28, no other leakage path is present.

Various modifications and improvements of the invention described herein are believed to be possible to one skilled in the art. However, no limitation of the invention is intended by way of the above description except as set forth in the appended claims.

I claim:

1. A seal system for a turbocharger for sealing passage of a rotatable shaft through a compressor backplate separating a turbocharger center housing and compressor housing from each other, comprising:

means integral with the backplate defining an annular recess opening axially toward the center housing said recess having a radially extending annular base wall bounded at its radially inner extent by an axially extending annular flange concentrically about the shaft, said recess being further bounded by at least one integral and radially projecting anti-rotation lug spaced axially from said base wall of said recess;

helical spring means receivable axially into said recess having a relatively low spring rate and a generally conical cross-section for compression substantially into a single plane;

a thrust washer having at least one slot formed therein for registry with said lug said thrust washer being receivable axially into said recess past said lug and then indexable with respect to said lug whereby said lug axially retains and limits axial travel of said thrust washer within said recess, said spring means exerting a force bearing axially against said thrust washer for urging said thrust washer in an axial direction toward said lug;

a generally annular seal member having at least one slot formed therein for registry with said lug, said seal member being receivable axially into said recess into bearing engagement with said thrust washer and including a seal face presented axially toward the center housing for sealing engagement with respect to the shaft;

passage means formed in said backplate bounding the radially outer extent of said recess for communicating the fluid pressure within the center housing to the axial side of said thrust washer opposite said seal member for assisting said spring means in urging said seal face into sealing engagement with respect to the shaft when said fluid pressure in the center housing exceeds the fluid pressure in the compressor; and an annular resilient seal ring concentrically between said seal member and said flange for preventing passage of fluid therebetween.

2. A seal system as set forth in claim 1 including a thrust bearing system having a thrust collar on the shaft for rotation therewith, said seal face comprising an axially presented face for sealing engagement with said thrust collar, and said spring means being for urging said seal member axially toward said thrust collar.

3. A seal system as set forth in claim 1 wherein said seal member includes a plurality of axially elongated slots about its periphery, and said anti-rotation lug comprises a corresponding plurality of radially inwardly projecting anti-rotation lugs bounding the radially outer extent of said recess and aligned for registering with said seal member slots, said thrust washer including a plurality of slots at its periphery for registering with said anti-rotation lugs.

4. A seal system as set forth in claim 1 wherein said seal member includes a radially inwardly directed annular shoulder, said resilient seal ring being axially positioned between said thrust washer and said shoulder, said seal member being responsive to said fluid pressure in the compressor housing to bear axially against said thrust washer when said compressor housing fluid pressure exceeds said fluid pressure in the center housing to substantially reduce the effect of said spring means acting upon said seal member.

5. A seal system for a turbocharger for sealing passage of a rotatable shaft through a compressor backplate separating a turbocharger center housing and compressor housing from each other, comprising:

means on the backplate defining an annular recess opening axially into the center housing and having a radially extending annular base wall bounded at its radially inner extent by a flange extending axially into the center housing and concentrically spaced about the shaft;

at least one anti-rotation lug integral with the backplate and projecting radially inwardly into said recess in axially spaced relation with respect to said base wall of said recess;

a thrust washer receivable into said recess and having at least one slot formed therein for registry with said lug, said thrust washer being receivable axially past said lug and indexable with respect thereto whereby said lug axially retains said thrust washer within said recess;

a spring received in compression between the backplate and said thrust washer, said spring reacting against said backplate to urge said thrust washer axially toward said lug;

a generally annular seal member receivable axially into said recess and having at least one slot formed therein for registering with said lug for prevention of rotation of said seal member with the shaft, said seal member including one axial end in bearing engagement with said thrust washer and a second axial end defining a seal face for sealing engagement with respect to the shaft; and an annular resilient seal ring concentrically between said seal member and said flange for preventing fluid passage therebetween, whereby said thrust washer and resilient seal ring are urged under pressure axially against said seal member to urge said seal face into relatively tight sealing engagement with respect to said shaft when the pressure in the center housing exceeds the pressure in the compressor housing adjacent passage of the shaft through the backplate, and said thrust washer and resilient seal ring are urged under pressure axially away from said seal member to substantially reduce sealing engagement of said seal face with respect to said shaft when the pressure in the compressor housing adjacent passage of the shaft through the backplate exceeds the pressure in the center housing.

6. A seal system as set forth in claim 4 including a thrust bearing system having a thrust collar on the shaft for rotation therewith, said seal face being for sealingly engaging said thrust collar.

7. A seal system as set forth in claim 4 wherein said spring comprises a relatively low rate helical spring having a generally conical cross section for compression substantially into a single plane.

8. A seal system as set forth in claim 5 including a radially inwardly directed annular shoulder formed on said seal member, said resilient seal ring being axialy positioned between said spring and said shoulder.

9. A seal system as set forth in claim 5 including passage means formed in the backplate for communicating the pressure within the center housing to the axial side of said thrust washer opposite said seal member.

10. In a turbocharger seal system having a rotatable shaft received through an opening in a compressor backplate separating a turbocharger center housing and compressor housing from each other, a method of sealing the opening comprising the steps of:

forming on the backplate an axially open annular recess opening into the center housing and having a radially extending base wall bounded at its radially inner extent by an axially extending flange concentric about the shaft and further bounded by at least one radially projecting anti-rotation lug spaced axially from the base wall of the recess;

receiving an annular compression spring into the recess in bearing engagement with the base wall of the recess;

receiving a thrust washer having a slot for registry with the lug into the recess past the lug into bearing engagement with the spring;

indexing the thrust washer with respect to the lug whereby the lug axially retains the thrust washer and spring within the recess; and receiving a generally annular seal member having at least one slot therein into the recess and into bearing engagement with the thrust washer wherein the slot is in registry with the lug such that the lug prevents rotation of the seal member with respect to the backplate and wherein the seal member has a seal face for sealing engagement with respect to the shaft.

* * * * *

UNITED STATES PATENT AND TRADEMARK OFFICE
CERTIFICATE OF CORRECTION

PATENT NO. : 4,420,160
DATED : December 13, 1983
INVENTOR(S) : Herman C. Laham

It is certified that error appears in the above-identified patent and that said Letters Patent are hereby corrected as shown below:

Column 7, line 26 should read:

6. A seal system as set forth in Claim 5 including a

Column 7, line 30 should read:

7. A seal system as set forth in Claim 5 wherein said

Signed and Sealed this

Seventh Day of May 1985

[SEAL]

*Attest:*

DONALD J. QUIGG

*Attesting Officer*     *Acting Commissioner of Patents and Trademarks*